United States Patent Office 3,199,939
Patented Aug. 10, 1965

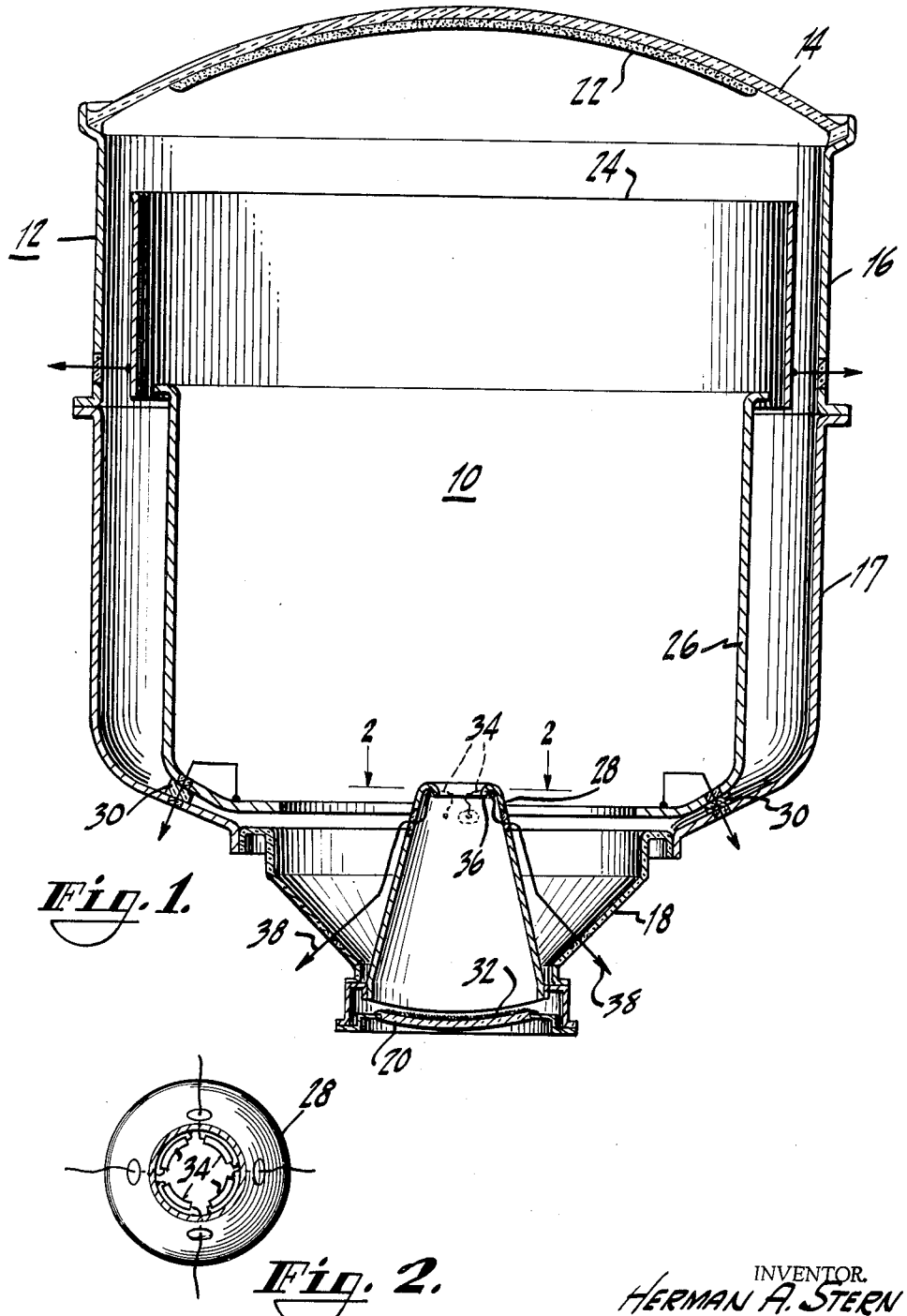

3,199,939
PHOSPHOR DEPOSITION
Herman A. Stern, Lancaster, Pa., assignor, by mesne assignments, to the United States of America as represented by the United States Atomic Energy Commission
Filed May 8, 1962, Ser. No. 193,290
1 Claim. (Cl. 316—5)

This invention relates to the art of depositing phosphor compounds. In particular, this invention relates to a novel method of depositing phosphor compounds in ray sensitive tubes.

In the prior art, there have been many methods of depositing phosphor materials. The phosphor materials have been deposited in various tube types such as cathode ray tubes, image tubes, and storage tubes. The methods of deposition have included silk screening, settling, spraying and evaporating. Although the known methods of depositing phosphors are quite useful, none of these known methods is suitable for use when the phosphor material is too deliquescent for exposure to the atmosphere. Thus, a phosphor such as thallium activated sodium iodide, can be deposited by standard techniques, but because of its property of absorbing moisture from the atmosphere, extreme care must be exercised on the controls of the method of deposition and after deposition. It cannot be exposed to the atmosphere.

Furthermore, there are certain phosphors which tend to react with atmospheric gases which may deteriorate the resulting phosphor. For this reason, it is desirable to deposit these phosphor materials in a vacuum and never expose the deposited material to the atmosphere.

Still further, there are certain tube types where it is desirable to deposit a phosphor only in a selected location. For example, in a certain direct viewing storage tubes, it is desirable to deposit a red emitting phosphor over half of the face plate and a green emitting phosphor over the other half of the face plate. The reason for this is that it is desirable to present different information in different colors. As is obvious, extreme care must be exercised when any of the conventional methods of depositing phosphors are utilized for such a production technique.

It is therefore an object of this invention to provide an improved method of phosphor deposition.

It is a further object of this invention to provide a novel method of phosphor deposition which is never open to atmospheric gases or vapors after deposition.

It is a further object of this invention to provide a novel method of depositing phosphor materials which may be accurately controlled as to quantity of material deposited and location of the deposited material.

These and other objects are accomplished in accordance with this invention by providing a method of phosphor deposition which is accomplished after tube exhaust. The method utilizes evaporation techniques for phosphor deposition and activation. The method includes the use of one or more evaorator boats permanently secured within an envelope the contents of which boats may be "flashed" after the bakeout and exhaust. The "flashing" may be done before or after the sealing-off step, of conventional tube processing, is performed. The phosphor evaporator boats may be arranged to deposit the phoshor on selected areas of a substrate.

The invention will be more clearly understood by reference to the accomanying single sheet of drawings wherein:

FIG. 1 is a sectional view of an image tube utilizing this invention; and,

FIG. 2 is a plan view partly in section, taken along line 2—2 of FIG. 1.

Referring now to the drawings in detail, there is shown an image tube 10 in which this invention is particularly useful. It should be clearly understood that the invention is applicable to any ray sensitive device wherein it is desired to deposit a phosphor material, such as cathode ray tubes, oscillographs, etc., and the image tube 10 is shown merely as an example of a tube type in which this invention is particularly useful.

The tube 10 comprises an envelope 12 which includes a light input glass face plate 14 which is sealed to one end of an annular metallic wall portion 16. The other end of the metallic wall portion is sealed to a second metallic wall portion 17. The metallic wall portion 17 is sealed to an insulating conical end portion 18. The insulating conical shaped section 18 may be made of a material such as glass. The smaller end of the conical portion 18 is, in turn, sealed to an output face plate 20. The metallic portions 16 and 17 may be formed of any metal which will readily seal to glass such as conventional chromium-ion alloys. The face plates 14 and 20 may be made of any light transparent material, such as glass, which will readily seal to the metal portion 16 and the conical portion 18. The face plates 14 and 20 should be selected for their transparency to the particular wave length that is to pass therethrough. For example, if the image tube 10 is designed to visibly reproduce an infrared image, the face plate 14 would be selected for its transparency to infrared radiations while the face plate 20 would be selected for its transparency to visible light.

On the inner surface of the input face plate 14 there is provided a photoemissive coating 22 which may be made of any conventional materials. For example, a multi-alkali photoemitter as described in U.S. Patent Number 2,770,561 to Sommer or an S11 photocathode, as described in U.S. Patent 2,676,282 to Polkosky may be used. Other known photocathodes may also be used.

Spaced from the photocathode 22 and within the envelope 12 is a first annular accelerating electrode 24. Extending within one end of the acceleration electrode 24 is the end of a second accelerating electrode 26. Extending within the opposite end of the accelerating electrode 26 is a smaller end of a frusto conical anode electrode 28. The electrodes 24, 26 and 28 may be supported within the envelope by any conventional means such as by insulating spacers 30 between the envelope wall and the electrodes. The electrodes 24, 26, and 28 may be made of any conventional material such as nickel.

On the output face plate 20 there is provided a layer of phosphor material 32. The phoshor material 32 is deosited by "flashing" or evaporating phosphor material from sealed evaporator boats 34 after the envelope 12 has been exhausted, or during the envelope exhaust, and the evaporator boats 34 remain in the envelope 12.

The evaporator boats 34 may be of the crimped metallic variety, e.g., tantalum, wherein selected material is placed within the boat and is crimped to seal the enclosed material from the atmosphere. When energized, by passing current therethrough, this type of boat expands to permit the enclosed material to be evaporated or flashed. Also, the evaporator boats may be made of a bulk mixture of the phosphor and other materials which can be exposed to the atmosphere. In the latter instances, the boats 34 should be degassed, during the degassing of the tube, prior to flashing or evaporation.

The evaporator boats 34, shown more clearly in FIG. 2 are positioned under a turned down lip portion 36 on the frusto conical anode electrode 28. Because of this position, material deposited by flashing, or evaporating, the material in various evaporator boats 34 will flow only toward the output face plate 20 and be deposited thereon. Because of the heat convection currents that occur during an evaporation process, caused by flashing or evaporation from the evaporating boats 34, it is preferable to have the face plate 20 facing upwardly during the process of depositing the phosphor material 32. The evaporated phosphor material, from the boats 34, condenses on the nearest cool surface, namely, the output face plate 20.

As is shown more clearly in FIG. 2, four separate evaporator boats may be utilized. By this arrangement, a phosphor deposit 32 which is quite uniform in thickness may be easily provided. For example, three oppositely deposited evaporator boats 34 may include rubidium iodide, while the remaining boats 34 may include an activator material for the rubidium iodide.

Thus, in the image tube 10, made in accordance with this invention, the envelope 12 would be baked at a temperature of approximately 350° C. and exhausted to a pressure of approximately $10^{-6}$ mm. The photoemissive cathode 22 may then be deposited in the conventional manner by flashing the materials onto the input face plate 14 from photocathode evaporator boats (not shown) positioned adjacent to the input face plate 14. Also, the phosphor screen 32, which may be approximately 10,000 to 50,000 Angstrom units thick, would be deposited by flashing the evaporator boats 34. After the photoemissive cathode 22 and the phosphor screen 32 are deposited, the envelope is sealed off.

Thus, the phosphor material 32 is never exposed to atmospheric gases or moisture when the crimped type evaporator boat is used and thus cannot become contaminated. If the bulk mixture type of evaporator boat 34 is used, the phosphor is in such a chemical form, when it is exposed to the atmosphere, that no deterioration will occur. The reason for this is that the material is not converted to a form which could be harmed by atmospheric exposure until after the envelope is evacuated. When using the structure shown, all four evaporator boats 34 may be flashed simultaneously, or in any desired sequence and for any desired length of time.

The phosphor in each boat 34 may be a predetermined weighted amount and the amount of phosphor deposited to form the layer 32 may then be determined by flashing to completion, i.e., the entire weighted amount is deposited. Also, an excess of material may be placed in each evaporator boat 34 and a selected current passed through the particular evaporator boat 34 for a predetermined length of time to slowly evaporate the material to deposit the desired amount of material which may be less than the amounts in the boats. The flashing, or evaporation, of the material in an evaporator boat may be accomplished by passing current, e.g., 25 amp, from a lead-in 38 through the frusto conical electrode 28.

Any phosphor materials, or mixtures thereof, may be used in the evaporator boats 34 providing the materials are suitable phosphor materials and are capable of evaporation. Examples of such materials are thallium activated rubidium iodide, thallium activated cesium iodide, thallium activated sodium iodide and combinations thereof. The activator may, for example, comprise approximately ½ to 3 molar percent of the material deposited.

When it is desired to deposit a particular phosphor material on one area of a substrate, and another material on an adjacent area, directive shields (not shown) may be provided around selected evaporator boats 34. Also, the evaporator boats 34 may be positioned in selected locations to deposit material on selected areas of the substrate.

It should be clearly understood that, although four evaporator boats 34 are shown, any number of evaporator boats may be used. Also, the evaporator boats may be arranged in any desired location. Still further, the novel method of this invention may be used with any tube type, e.g., a cathode ray tube, and an image tube is shown merely as an example of the use of this invention.

It should also be clearly understood that the "flashing" or evaporating of the phosphor material may be done after the envelope has been sealed off. In fact, the deposition after sealing off is preferred provided that the evaporator boats 34 have been previously degassed, and the phosphor material is of such a chemical composition as not to harm the vacuum enclosed by the envelope 12. If the phosphor would tend to harm the vacuum, or produce a gassy tube, the deposition is done while the tube is still in the vacuum pump and prior to sealing off. In either instance, the phosphor evaporator boats 34 are sealed within the envelope 12.

Thus, applicant's invention describes a new and novel method of depositing phosphor materials, inside of an evacuated envelope, after the envelope has been baked, and exhausted. Due to this timing sequence, danger of the phosphor being contaminated by exposure to air is eliminated.

What is claimed is:

The method of manufacturing a ray sensitive discharge device comprising the steps of:

(a) positioning at least two crimped metal evaporator boats containing different ray sensitive materials and having separate electrical leads, in an envelope;

(b) evacuating said envelope;

(c) opening sequentially said crimped metal boats by heating sequentially each boat by passing an electrical current through said electrical leads;

(d) evaporating directionally, sequentially, and quantitatively the different ray sensitive materials on a specific portion of the inside of the envelope by further sequential heating of said boats by sequentially passing an electric current through said separate electrical leads;

(e) condensing said ray sensitive materials on a surface in said envelope; and, (f) then sealing said envelope from the atmosphere.

References Cited by the Examiner

UNITED STATES PATENTS 1,877,718   9/32   Noble _____ 316—12 X

FRANK E. BAILEY, *Primary Examiner.*